United States Patent Office 3,668,012
Patented June 6, 1972

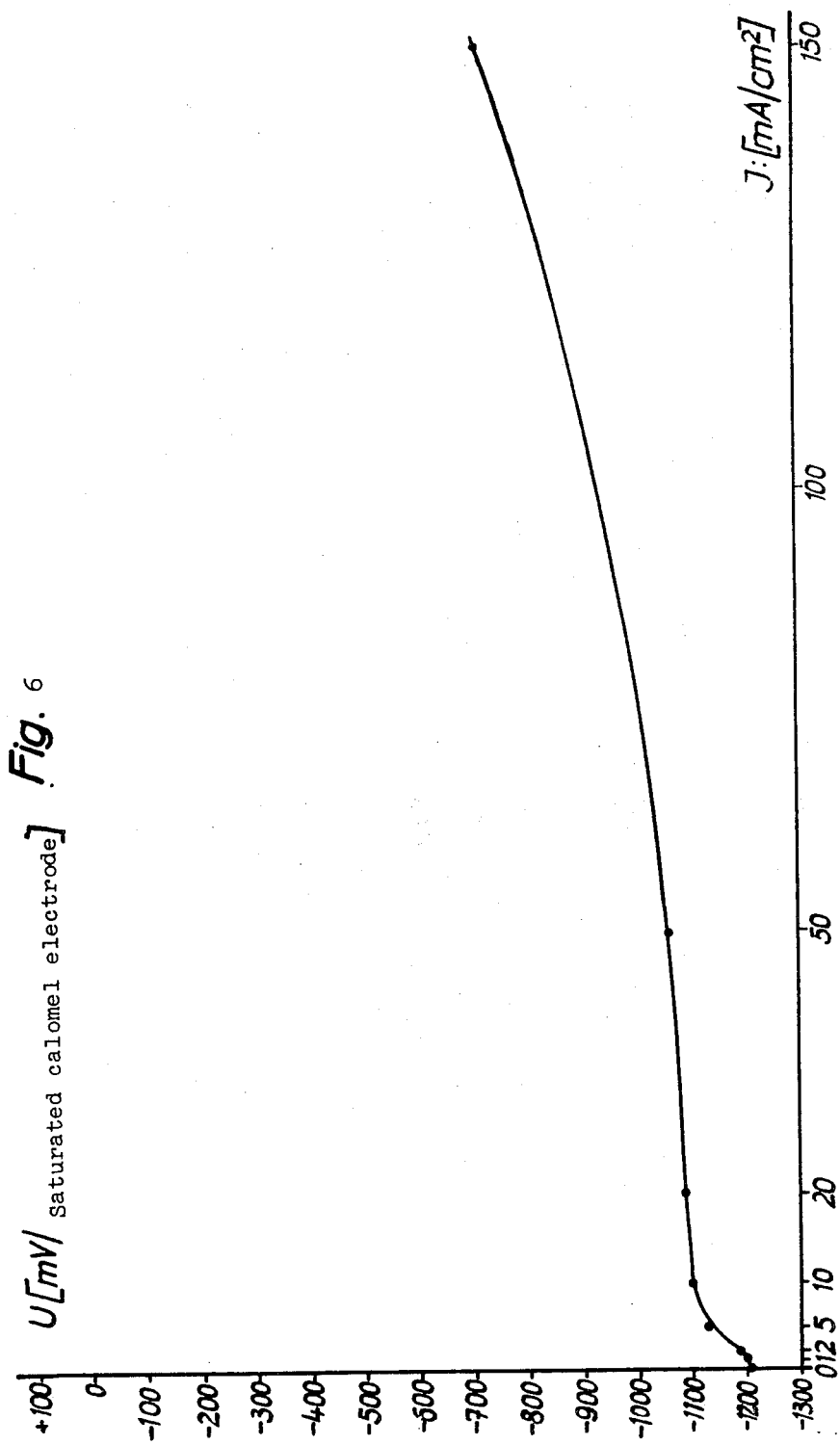

3,668,012
ELECTRODE FOR ELECTROCHEMICAL DEVICES AND METHOD OF ITS MANUFACTURE
Margarete Jung, Kelkheim, Taunus, and Hans H. von Doehren, Frankfurt am Main, Germany, assignors to Varta Aktiengesellschaft, Frankfurt am Main, Germany
Continuation-in-part of application Ser. No. 325,567, Nov. 22, 1963. This application Nov. 13, 1968, Ser. No. 791,827
Int. Cl. H01m 27/04
U.S. Cl. 136—86 D ... 7 Claims

ABSTRACT OF THE DISCLOSURE

An electrode especially suitable for use in electrochemical cells, like in a fuel cell with alkaline electrolyte in which the catalytically active metal is Raney metal, Raney iron or Raney cobalt partically coated with copper, mercury, silver, or alloy or a mixture thereof. The fuel cell comprising conventional elements, an alkaline electrolyte and said electrode. The electrodes have improved catalytic activity, especially improved load capacity and an improved rest potential.

---

Figure 1:
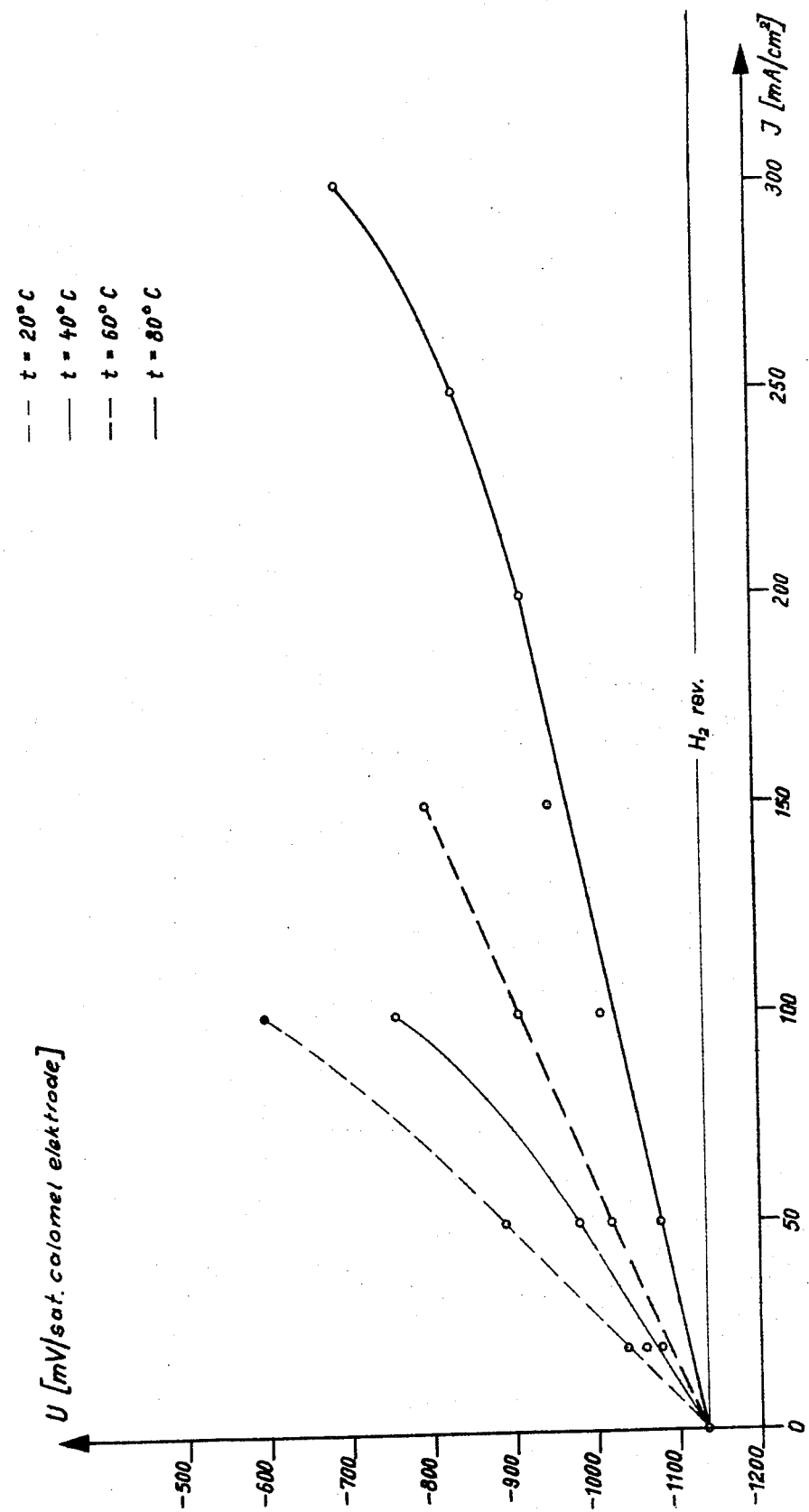

The present application is a continuation-in-part of copending application Ser. No. 325,567, filed Nov. 22, 1963 now abandoned.

The present invention relates to improvements in electrodes for electrochemical devices and more particularly for galvanic fuel cells, said electrodes comprising a suitable catalyst like Raney nickel, Raney iron or Raney cobalt coated with copper, mercury, silver, the mixture or alloys thereof.

Numerous electrodes consisting of metallic material as active component have become known. Such electrodes, and especially negative electrodes, may consist, for instance, of porous carbon bodies impregnated with noble metals. So-called double skeleton catalyst electrodes which consist essentially of a supporting skeleton and Raney metals contained therein, have also proved of value. They are obtained, for instance, by compressing and sintering a mixture of carbonyl nickel powder or another finely divided, electrically conductive corrosion-resistant material and of pulverulent Raney alloys and activating the resulting electrode bodies by treating the same with aqueous alkali metal hydroxide solutions.

It is also known to use so-called promoters in the production of such electrodes in order to improve their catalytic activity. Usually these promoters are admixed with the catalyst powder when producing the electrodes.

Furthermore, it has also been suggested to use catalysts for chemical reactions which consist of mixtures of metals or of metal alloys, or, respectively, are coated with certain metals as promoters. The promoting effect of such metals, especially of copper as alloying component of Raney nickel, however, is rather doubtful. According to G. M. Schwab: "Handbuch der Katalyse," vol. 5, page 510, the hydrogenation rate of a Raney nickel catalyst containing copper as alloying component is much lower than that of a pure Raney nickel catalyst. According to "J. Amer. Chem. Soc.," vol. 57, page 1298 (1935), attempts have been made to further increase the activity of activated Raney nickel for hydrogenation by a treatment with copper sulfate. However, the results did not show any improvement over untreated Raney nickel catalyst.

It is one object of the present invention to overcome these disadvantages and to produce considerably improved electrodes for electrochemical devices, particularly for galvanic fuel cells with alkaline electrolyte, which electrodes comprise substantially only metals as catalytically active component coated wtih certain other metals.

Another object of the present invention is to provide a simple and effective process of producing such catalytically active metallic electrodes.

Other objects include the provision of a new electrode, a new electrochemical cell and a new fuel cell.

Other objects of the present invention and advantageous features thereof will become apparent as the description proceeds.

The electrodes according to the present invention are considerably improved in their catalytic activity by providing their catalytically effective areas, at least partly, with a coating of copper, mercury, silver, or mixtures of such metals. Electrodes provided with such a coating according to the present invention are especially suitable for the electrochemical conversion and reaction of a fuel in fuel cells. They can also be used for fuel cell-like devices for the controlled oxidation or, respectively, reduction of chemical compounds as described, for instance, by Margarete Jung and Gerhard Grueneberg in U.S. Pat. 3,316,161. Furthermore, they can be used as electrodes for pH-measuring apparatus and for devices used in gas analysis as described, for instance, in German published application No. 1,153,551.

The electrodes according to the present invention preferably contain, as catalytically active metals, Raney metals, such as Raney nickel, Raney cobalt, Raney iron, or mixtures thereof, if desired with the addition of so-called promoters. The promoters can be noble metals such as platinum, palladium, rhodium, iridium, or of chromium, tungsten, molybdenum, and the like. The supporting skeleton of these electrodes comprises an electrically conducting, mechanically stable material, for instance, of nickel, iron, silver, or preferably of alloy of the approximate composition of NiAl, which is especially resistant to alkaline electrolytes.

The electrodes are especially suitable as fuel electrodes for the electrochemical reaction of hydrogen, alcohols, aldehydes, and other pre-oxidized hydrocarbons as well as of ammonia and hydrazine. The electrodes operate at normal temperature as well as at elevated temperature, whereby the fuel may be conducted and supplied to the electrodes in gaseous or vapor form, or in mixture with the electrolyte.

It is also possible to improve electrodes not containing Raney metals as catalysts with respect to their load capacity and their potential by coating them with the above-mentioned metals. For this purpose, for instance, sintered electrodes consisting of finely divided metal grains are subjected to a pretreatment with strong reducing agents yielding hydrogen, such as sodium boron hydride. Electrodes are also improved which have a porous supporting skeleton of metal, carbon, or plastic and contain in said supporting skeleton metals as catalysts obtained by chemical or electrochemical reduction of corresponding metal compounds. For this purpose the catalytically active metals need not be arranged on a mechanically rigid, porous skeleton. The improvements can also be achieved by the metal coating with electrodes which contain the catalyst on a loose supporting material, for instance, with electrodes which contain the impregnated carrier loosely poured between sieves, screens, nets, or the like. Such electrodes are especially suitable for cells in which the fuel is dissolved in the electrolyte. Furthermore, catalysts, suspended in the electrolyte, may also be improved by the metal coating according to the present invention. Considerable improvements may be achieved with electrodes in the preparation of which Raney metals were not used as starting material, but whereby Raney alloys were formed. Such a formation of Raney alloys takes place, for instance, when sintering together finely divided aluminum and finely divided nickel in predetermined amounts.

According to the present invention, electrodes, which are at least partly coated with copper, mercury, or silver, may also be coated for special purposes with a mixture of said metals, or an alloy thereof, or they may contain other suitable metals in addition to the above-mentioned metals in the coated surface.

The electrodes of the invention have a combination of advantageous properties. It has been found that an electrode where for instance the catalytically active metal is Raney metal, Raney iron or Raney cobalt which has been partially coated with a mercury coating has an especially high load capacity.

It has been further found that partial coating of the catalytically active areas of the electrode, especially with copper, causes an increase in the hydrogen potential by about 30 mv. to about 50 mv. to a value between about −1165 mv. and about −1185 mv. determined against a saturated calomel electrode in 6 N potassium hydroxide solution. Copper coated electrodes can be charged about three times as high as electrodes without copper coating and mercury coated electrodes about four to five times as high as electrodes without mercury coating.

Electrodes of the invention show a rest potential of more than −1200 mv. determined against a saturated calomel electrode. Such electrodes have a potential of more than −100 mv. under a load of more than 400 ma./sq. cm. determined against a saturated calomel electrode.

An additional advantage of such partly coated electrodes is their resistance to oxygen in statu nascendi, so that the electrodes are not damaged even on charging if the fuel supply is interrupted.

Furthermore, the copper, mercury, or silver coating over the catalytically active metal has the advantage of imparting excellent electronic conductivity to the catalytically effective areas of the electrode, so that no noticeable loss of voltage takes place when the curent flows from the current-supplying three-phase boundary to the current lead off.

Moreover, it was found that activation of electrodes containing Raney alloys with the coating specified proceeds more rapidly when, for instance, copper or mercury or their alloys are provided.

It is, of course, also within the scope of the present invention to use, in place of mixtures of said metals, also alloys thereof for coating the electrodes.

There are a number of alternative methods for making the electrodes of the invention. Electrodes containing Raney alloys are preferably metal coated according to the present invention by adding the metals during activation of the Raney catalysts. It is, however, the more appropriate procedure to use, instead of the coating metals themselves, corresponding metal compounds and especially complex metal compounds which are resistant even to the strongly alkaline activation solution and which are decomposed directly on contact with the electrode to be activated, thereby yielding the desired metal precipitate at the active centers of the electrode. It is, of course, understood that such complex metal compounds can be formed directly in the activating solution by the addition of complex forming agents, for instance, of salts of tartaric acid. The preferred procedure is to add the metals or metal compounds to the activating solution shortly after the onset of the first vigorous hydrogen evolution. Thereby precipitation of the metals proceeds uniformly and can usually be recognized by the change in appearance of the catalyst surface. When proceeding in this manner, the metals cause accelerated activation.

According to another embodiment of the present invention, the metal coating, of course, may be applied to the electrode surface during or after activation by electrolytic precipitation according to well known methods. Coating with metals may also be effected by exchanging the respective metal to be percipitated for a less noble metal of the electrode body. The metal may also be precipitated by cementation.

Nitrates, chlorides, carbonates, and salts of organic acids have proved to be especially suitable salts for precipitation of the metal coating on the electrode surface. Of course, salts of other acids may also be used. Care must be taken, however, that the acid component of the metal salt used does not impair the catalytic activity of the electrode. When using soluble metal complex compounds, an especially good and uniform precipitation of the metals on the electrode surface is achieved.

Preferably 0.1 mg. to 100 mg. of the desired copper, mercury or silver metal or mixture of metals or a corresponding amount of the respective metal salt are used for each geometrical square centimeter of catalytically active electrode surface. These amounts may, of course, be exceeded or lower amounts may be used. Especially satisfactory metal coatings are produced, for instance, on a nickel double skeleton electrode of 25 cm.$^2$ geometrical surface by about 2.5 mg. of the coating metal or metal mixture.

Figure 2:
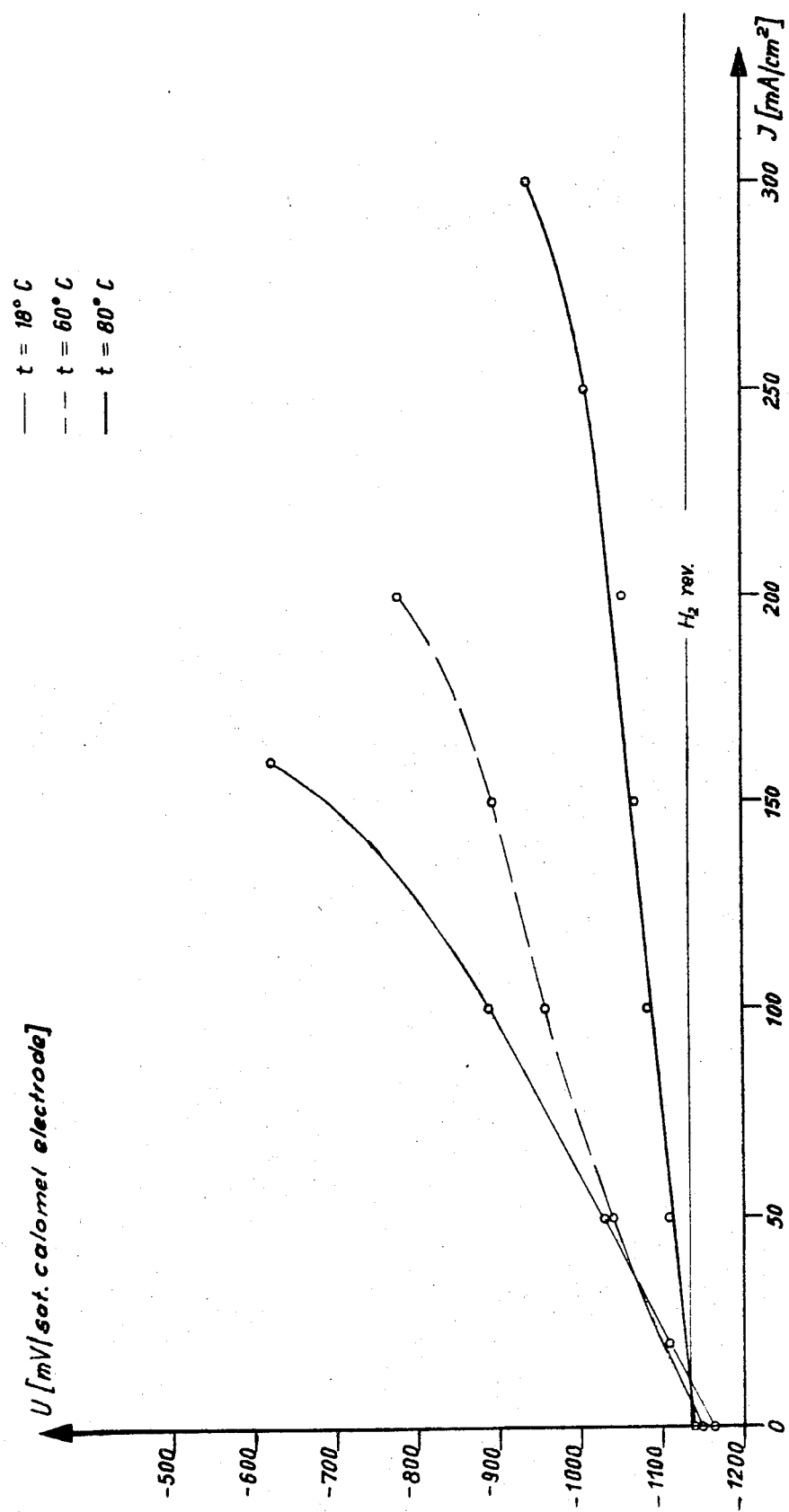
Figure 3:
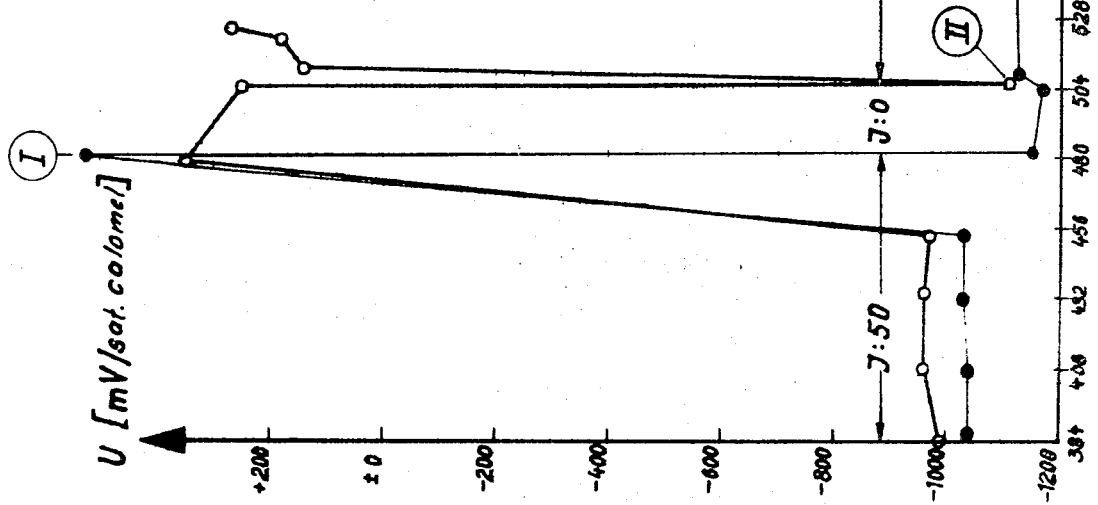
Figure 4:
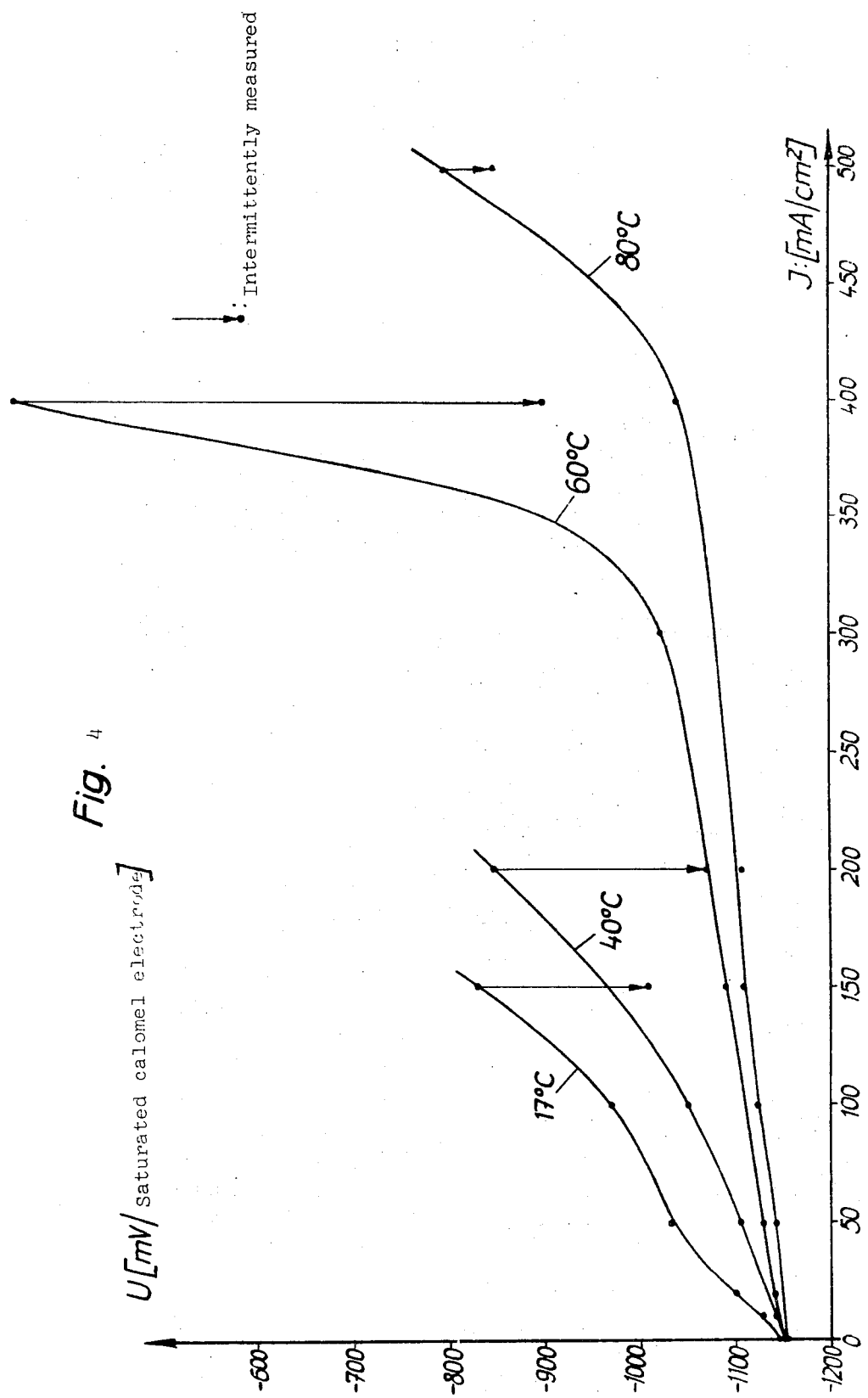
Figure 5:
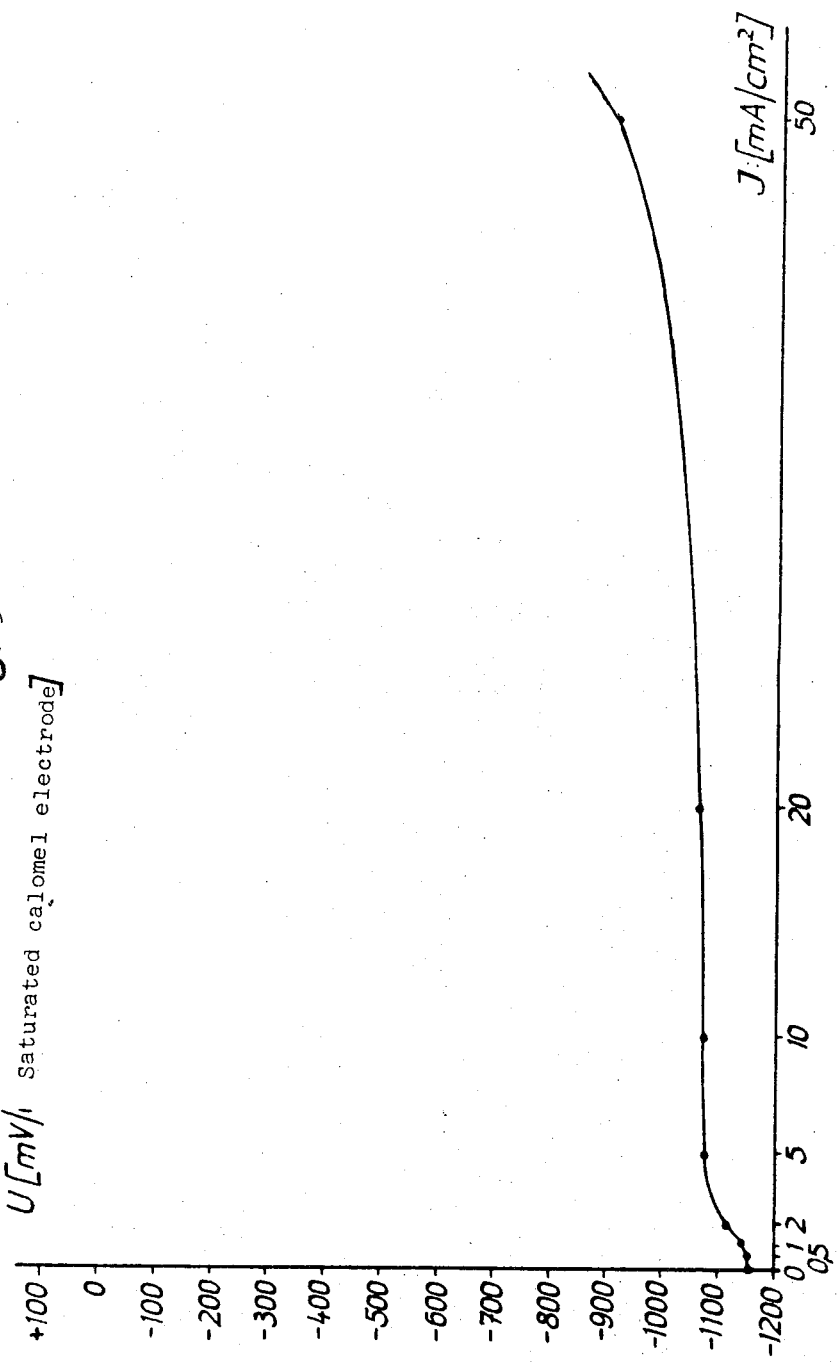

The attached drawings represent graphs illustrating performance of the electrode in the operation of fuel cells with electrodes according to the present invention wherein FIG. 1 is a graph illustrating the voltage curves of an electrode to Example 2 operating at various temperatures;

FIG. 2 is a graph illustrating the voltage curve of an electrode according to Example 3.

The above and other objects, features and advantages of this invention will be more fully explained by the following examples without, however, limiting the same thereto.

EXAMPLE 1

In order to produce disk-shaped double skeleton electrodes, 2 g. of a mixture of 1 part, by weight, of Raney nickel and 1.5 parts, by weight, of carbonyl nickel were used to form the coating metal layer while 17 g. of a mixture of 1 part, by weight, of Raney nickel and 1.3 parts, by weight, of carbonyl nickel were used to form the working layer. Both layers were compressed in a mold under a pressure of 4 tons/sq. cm., thereby forming electrodes of a diameter of 4 cm. and a thickness of 4 mm. These tablets were sintered at a temperature of 690° C. in hydrogen gas.

To activate the electrodes, they were immersed into a 6 N potassium hydroxide solution. As soon as the initial strong hydrogen evolution ceased 7.5 mg. of copper in the form of copper nitrate were added. Activation was completed by heating to a temperature of 80° C.

The rest potential of the resulting electrodes, used as hydrogen electrodes in fuel elements with 6 N potassium hydroxide solution as electrolyte, was −1180 mv. determined against a saturated calomel electrode.

A similarly prepared double skeleton electrode without copper coating had a rest potential of −1135 mv. under the same condition.

The electrode prepared according to Example 1 was tested in a fuel element at a potential of −1120 mv. against a saturated calomel electrode at a load of 50 ma. per sq. cm. The hydrogen supply was then discontinued. After a certain period of time a potential of +245 mv. was determined in relation to a saturated calomel electrode. Thereafter, hydrogen was again supplied. The electrode had again attained its initial potential after 5 hours and could be operated continuously at said load without any substantial decrease of the potential. Ordinary double skeleton electrodes without copper coating, show a considerable decrease in their potential immediately on applying the load although their initial potential is reestablished under the above given conditions after a certain period of time.

EXAMPLE 2

The double skeleton electrode prepared according to Example 1 was immersed in a 6 N potassium hydroxide solution to cause activation. As soon as the initial strong hydrogen evolution ceased, 25 mg. of mercury nitrate were added thereto. Activation was then completed by heating.

The rest potential of the electrode in a half cell arrangement with 6 N potassium hydroxide solution as electrolyte was between —1165 mv. and —1150 mv. at a temperature between 17° C. and 80° C., as tested in relation to a saturated calomel electrode. A similarly prepared double skeleton electrode without mercury coating had a rest potential of —1135 mv. at room temperature. FIG. 1 shows graphs of voltage curves of the electrode at temperatures of 17° C., 40° C., 60° C., and 80° C. with a hydrogen gas pressure of 1.4 atm. gauge.

EXAMPLE 3

An electrode prepared according to Example 1 was coated with 25 mg. of silver used in the form of its nitrate. The voltage curve of such an electrode is shown in FIG. 2 at a temperature of 21° C. and with a hydrogen pressure of 1.4 atm. gauge.

EXAMPLE 4

An electrode body of the dimensions as given in Example 1 was produced by compressing 20%, by weight, of aluminum powder of a grain size smaller than 30$\mu$ and 80%, by weight, of carbonyl nickel powder of a grain size between 5$\mu$ and 8$\mu$ under a pressure of 2 tons/sq. cm. This resulting compressed body was sintered at a temperature of 550° C. in a stream of hydrogen for half an hour. Thereby, nickel alloys which are poor in aluminum, for instance, of the composition NiAl, as well as nickel alloys rich in aluminum were formed. The latter alloys were activated in the compressed and sintered electrode like Raney nickel alloys in an analogous manner as described in Example 1 by immersion in a 6 N potassium hydroxide solution. Shortly after the initial vigorous hydrogen evolution had ceased, 7.5 mg. of copper in the form of copper nitrate were added to said electrolyte. The activation was completed by heating to 80° C.

A load of 214 ma./sq. cm. was applied to the electrode arranged in a fuel cell with 6 N potassium hydroxide solution as electrolyte and at a hydrogen pressure of 0.8 atm. gauge, whereby a potential of —900 mv. was measured in relation to a saturated calomel electrode. The operating temperature was 60° C.

An otherwise alike electrode was prepared without the addition of copper during activation. To such an electrode there could be applied a load of only 78 ma./sq. cm. at a potential of —900 mv. under otherwise the same operation conditions.

The load capacity of the electrode without the addition of copper at the indicated potential was 72 ma./sq. cm. at an operating temperature of 40° C. and 42 ma./sq. cm. at an operating temperature of 18° C. while the load capacity of the same electrode activated with copper, was 118 ma./sq. cm. at an operating temperature of 40° C. and 70 ma./sq. cm. at an operating temperature of 18° C.

It is evident that the load capacity and/or adjustment of the rest potential of electrodes are very considerably improved when providing said electrodes according to the present invention with a coating of copper, mercury, silver, or mixtures of said metals.

EXAMPLE 5

4 g. of a Raney nickel alloy powder is stirred in a 6 N potassium hydroxide solution containing 5 mg. of metallic copper in the form of copper nitrate at room temperature. Thereafter, the mixture is heated to about 80° C. to complete activation. The resulting copper coated nickel catalyst powder is placed between two fine-meshed sieves forming an electrode.

This electrode is arranged in a fuel cell with 6 N potassium hydroxide solution as electrolyte and a nickel plate as counter electrode. A frit is inserted between the electrode and the nickel plate to prevent access of the methanol fuel which is dissolved in the electrolyte space of the fuel electrode, to the counter electrode. The methanol fuel concentration in the electrolyte is 0.1 molar.

The rest potential of such a half cell arrangement is —1060 mv. at 25° C., determined in relation to a saturated calomel electrode. When subjected to a load of 10 ma./sq. cm., the potential of the electrode is —970 mv.; when subjected to a load of 20 ma./sq. cm., it is —895 mv.; when subjected to a load of 30 ma./sq. cm. it is —850 mv.; and when subjected to a load of 40 ma./sq. cm. it is —810 mv. Without the addition of copper, the electrode potential is determined under the same loads as —912 mv. (10 ma./sq. cm.); —810 mv. (20 ma./sq. cm.) and —635 mv. (30 ma./sq. cm.). The latter electrode broke down completely under a load of 40 ma./sq. cm.

EXAMPLE 6

An electrode composed of activated Raney nickel is immersed after activation into mercury. Excess mercury is squeezed off. Such an electrode was arranged in a half cell against a nickel plate as counter electrode as described in Example 6. A solution of 50 g. of potassium boron hydride in 750 cc. of 6 N potassium hydroxide solution is used as fuel. The geometrical surface of the electrode is 12.6 sq. cm.

The rest potential of such an electrode is —1310 mv. as determined in relation to a saturated calomel electrode. The potential is —1260 mv. under a load of 10 ma./sq. cm.; —1280 mv. under a load of 20 ma./sq. cm.; —1170 mv. under a load of 50 ma./sq. cm.; —1090 mv. under a load of 100 ma./sq. cm.; —985 mv. under a load of 200 ma./sq. cm.; and —800 mv. under a load of 500 ma./sq. cm.

EXAMPLE 7

Following the procedure of Example 1, there is added copper nitrate and silver nitrate 5 mg. and 15 mg., respectively to the activation solution. The electrode catalyst is then coated with a mixture of copper and silver.

The same procedure is followed to obtain a coating of mercury and copper. The electrodes in fuel cells exhibit improved performance over conventional electrodes.

It may be pointed out that the preferred skeleton support used, for instance, in the above mentioned double skeleton electrodes is a nickel support which is cheaper than, for instance, a silver support and has not the disadvantageous properties of an iron support.

In place of hydrogen used as fuel in the fuel cells according to Examples 1 to 5, of methanol used according to Example 6, or of potassium boron hydride used according to Example 7, there may be employed other fuels although those mentioned have proved to be especially suitable. Ammonia and hydrazine, for instance, may also be used for this purpose.

6 N potassium hydroxide solution has proved to be an especially suitable electrolyte due to its satisfactory hydroxyl ion concentration, conductivity, and viscosity although alkali metal hydroxide solutions of lower concentration may also be employed. Other conventional alkaline electrolytes are also suitable.

Copper, mercury chlorides and nitrates and silver nitrate are preferably used for producing the metal coatings. They are, somewhat more suitable than, for instance, the acetates. Of course, other metal compounds which do not precipitate in the strongly alkaline activation solutions and preferably metal complex compounds as they are obtained by the addition of potassium sodium tartrate to alkaline metal salt solutions are useful for this purpose.

It is, of course, understood that activation of the electrodes may be effected in any other manner than described in the preceding examples, that the metallic electrode body may be prepared from other catalytically active metals than mixtures of Raney nickel and carbonyl nickel or, respectively from aluminum powder and carbonyl nickel powder, that molding said catalytically active metallic electrodes to the desired electrode bodies may be effected under higher or lower pressures than those given in the examples, that the molded electrode bodies may be sintered at higher or lower temperatures than those given in the examples, that the catalytically active metal surface of such electrodes may be coated in a manner different from that described in the examples, and that other changes and variations in the manufacture of electrodes according to the present invention may be made by those skilled in the art in accordance with the principles set forth herein and in the claims annexed hereto.

The electrodes of the invention are especially well suited for use as fuel cells in conjunction with other conventional elements, including an alkaline electrolyte. A typical fuel cell comprises an alkaline electrolyte like 6 N sodium hydroxide in which the electrode of the invention is immersed as the fuel electrode and a counter electrode, such as a carbon electrode, both fixed in suitable holders. The electrodes are connected to an electrical circuit to take off the electrical current which is generated. Typical U.S. patents disclosing conventional fuel cells include U.S. Pats. 2,901,523; 2,928,891; 3,121,031; and 3,201,282, for which the electrodes of the invention provide improved performance. It is operative with considerably higher load without substantial decrease in potential than conventional fuel cell electrodes.

We claim:

1. A fuel cell comprising a fuel electrode, a counterelectrode and an alkaline electrolyte, the fuel electrode comprising as the catalytically active metal, a metal of the group consisting of Raney nickel, Raney iron and Raney cobalt, said metal having copper, mercury, silver, or a mixture or an alloy thereof precipitated on the catalytically active areas thereof, and wherein the copper, mercury or silver is from about 0.1 to not more than 100 mg. per cm.$^2$ of catalytically active geometrical electrode surface, and wherein the precipitation is performed by a process which comprises activating a Raney nickel alloy, Raney iron alloy or Raney cobalt by immersion in a strongly alkaline solution, thereby causing evolution of hydrogen gas, adding a water-soluble salt of copper, mercury or silver to said solution shortly after the onset of vigorous hydrogen evolution and during subsequent hydrogen evolution thereby precipitating said copper, mercury or silver at the catalytically active areas.

2. The fuel cell of claim 1 wherein in the process the water-soluble salt is nitrate, chlorate or carbonate.

3. The fuel cell of claim 1 wherein the precipitation is followed by heating the solution to complete activation.

4. The fuel cell of claim 1 wherein the precipitated metal is silver.

5. The fuel cell of claim 1 wherein the precipitated metal is mercury.

6. The fuel cell of claim 1 wherein the precipitated metal is copper.

7. The fuel cell of claim 1 wherein the fuel electrode is a double skeleton electrode.

References Cited

UNITED STATES PATENTS

| 3,123,574 | 3/1964 | Zajcew | 252—474 |
| 3,184,417 | 5/1965 | Hort | 252—472 |
| 3,242,011 | 3/1966 | Witherspoon | 136—120 |
| 3,392,059 | 7/1968 | May | 136—120 FC |
| 2,892,801 | 6/1959 | Sargent | 252—477 R |
| 3,036,973 | 5/1962 | Hindley | 252—477 R |
| 3,201,282 | 8/1965 | Justi et al. | 136—86 |

WINSTON A. DOUGLAS, Primary Examiner

H. A. FEELEY, Assistant Examiner